United States Patent Office 3,137,586
Patented June 16, 1964

3,137,586
LOW ELECTRICAL RESISTANCE METAL TO
METAL OXIDE BONDING COMPOSITION
Robert H. Pry, Schenectady, N.Y., assignor to General
Electric Company, a corporation of New York
No Drawing. Filed Jan. 28, 1960, Ser. No. 5,117
1 Claim. (Cl. 106—286)

The present invention relates to bonding compositions and more particularly to compositions and methods for treating the surfaces of metal oxide ceramic bodies and for forming strong joints of low electrical resistance between separate metal and metal oxide bodies.

Ceramic bodies made of sintered powder metal oxides have become widely used due to the superior and often unique physical, electrical and electronic properties which can be obtained. The joint of the present invention is particularly valuable with regard to the electrical and electronic applications of the oxide bodies, although it has major applicability in obtaining strong physical connections or joints also. A serious problem in using mixed metal oxide bodies such as ferrites, niobates and related compositions, for example, in electrical applications, has been the lack of joining means for obtaining a mechanically strong joint of low electrical resistance between the metal oxide ceramic body and an electrical contact.

A principal object of this invention is to provide a composition for treating the surfaces of metal oxide bodies which makes possible the obtaining of a mechanically strong joint of extremely low electrical resistance between the metal oxide body and a separate metal body.

An additional object of this invention is to provide a bonding composition for forming joints between separate metal and metal oxide bodies which are both strong and of low electrical resistance.

An additional object of this invention is to provide a process for forming mechanically strong joints of low electrical resistance between separate metal and metal oxide bodies.

Generally, the basic composition of the present invention comprises finely-divided iron particles, an inorganic binder such as glass which is fusible at the bonding temperature, and an activating agent in which the metal oxide is partially soluble. The activating agent is used in an amount sufficient to make the composition of a consistency conducive to easy distribution over the area to be joined. A metal such as silver, gold or platinum may be added to the basic composition, if desired, to facilitate forming of the joint.

As previously mentioned, this invention is principally concerned with compositions and methods for joining metal bodies to metal oxide bodies. Specifically, the metal oxide bodies primarily involved are those which are useful in electrical applications. These include, but are not limited to, materials such as zinc titanate, barium titanate, zinc oxide, nickel oxide, cobaltous oxide, zinc-nickel titanate, zinc-cobalt titanate, manganese oxide, cobalt oxide, copper oxide mixtures and mixtures of nickel oxide, titanium dioxide, and zinc oxide. Niobates, tantalates, ferrites and other recognized ceramics used in electrical and electronic applications may be used as effectively as the titanates.

The metal oxide materials, in order to be used effectively, must be joined to an electrical contact, which in most cases will be copper, although not exclusively so. Obviously, if the maximum benefit is to be derived from the unique properties of these metal oxide ceramic bodies the electrical resistance present at the joints between them and their respective electrical contacts should be extremely low. Additionally, since these parts are often subject to vibration and shock, for example, when they are placed in apparatus such as aircraft, automobiles, etc., the joint formed between a ceramic body and its electrical contact must be mechanically strong.

The ingredients of the basic composition used for treating the metal oxide ceramic bodies to obtain the desired joint are powdered iron of not greater than about 100 mesh particle size, an inorganic binder such as glass particles of smaller size than the iron particles, and an activating agent capable of dissolving a small portion of the metal oxide. Ammonium hydroxide, for example, has been found to be extremely useful as an activating ingredient. There will usually be 8 to 12 volume parts of activating agent present for each volume part of inorganic binder used. Generally, the particle size of the iron should be of no greater than 300 mesh to provide a more easily spreadable mixture, although larger size can be used, as already mentioned. The total combined amounts of activating agent and inorganic binder will generally be from 0.5 to 1.5 the volume proportion of iron particles used to obtain optimum properties.

The type of inorganic binder which is used is not important so long as it will fuse at the temperature at which the bonding is being effected, this temperature normally falling within the range of from about 650 to 800° C. Additionally, if glass is used as the binder, the particular type used is not important. Sodium, potassium, and lead glasses, which contain an appreciable silicate content, will all work effectively. Silica powder, used alone, is also effective. One silica material which is particularly useful as a binder is silica gel. This substance fuses readily between 650 to 800° C., thus falling within a temperature range at which most bonds to electrical metal oxide bodies would be made and, at the same time, provides a glass constituent protecting the iron powder from contamination by atmospheric oxygen.

The basic ingredients are used to treat the surface of the ceramic metal oxide body, additional soldering alloy being used to effect the bond between separate metal and metal oxide bodies. The selection of a suitable solder is determined principally by the type of metal body being joined and the temperature at which the joint is to be made. Known solders such as lead-tin, lead-tin antimony, lead-silver alloys are all readily usable.

The basic composition is benefited by the addition of metals which are more solderable than iron, specifically silver, gold or platinum in particle form. These metals are more easily wetted by the soldering alloy and greatly assist the formation of a strong joint of low resistance. When used, the silver, gold or platinum metals are added in amounts approximately equal to the quantity of iron used, although this is not critical and substantial variation in composition may take place. For best results, there will normally be from 40 to 60 volume percent of each of the metal powders.

The process for producing a joint comprises covering the surface area of the metal oxide body with a thin coating of the basic composition and then firing at a temperature of from 650 to 800° C. to fuse the inorganic binder and cause the iron particles to reduce the surface of the oxide and subsequently sinter the iron particles to the oxide surface. During firing, the glass particles present in the composition will fuse and prevent any contamination of the iron particles from atmospheric oxygen. If the iron particles are allowed to become contaminated by exposure to the air during firing or the firing is continued for too long a period, they will oxidize and no effective joint or bond can be obtained. The firing must be of such duration that the glass particles become fused. This normally requires from about 5 to 30 minutes, the particular time not being essential so long as within the stated range. It will be realized, of course, that the length of firing will decrease with an increase in temperature and increase with a decrease in temperature.

Following treatment of the metal oxide surface with the basic composition, both the metal and the metal oxide bodies are treated with a suitable flux, which can be either acid or rosin depending upon the solder to be used to make the joint, and then soldered according to existing procedures.

The process can also be carried out by incorporating one of the more readily solderable metals, silver, gold or platinum, in the original composition, or, a silver paint can be applied to the surface of the basic composition, either before or after firing, and the soldering operation then carried out.

Joints were produced according to this invention on individual bodies made of zinc oxide, iron oxide, nickel oxide, their titanates, mixtures of cobalt, copper and manganese oxides and cermets containing iron, nickel, cobalt and copper. All were covered with a composition consisting of iron powder of about 300 mesh and silica gel in ammonium hydroxide. The silica gel and ammonium hydroxide were present in proportions of about 1 to 10 by volume, and to this mixture was added powdered iron in a volume proportion of about 1 to 1. Silver paint was applied to the basic composition both before and after a firing operation carried out at 725° C. for 15 minutes and soldering with a lead-silver solder was then accomplished. The joints obtained were equally good regardless of the time at which the silver paint was applied.

The proportions of the ingredients may be varied to fit the particular situation. If, for example, the composition is to be sprayed on the metal oxide body, a larger proportion of liquid activating agent will be used. On the other hand, if it is to be brushed or otherwise mechanically spread over the area to be joined, then lesser amounts of liquid may be used. Generally, however, the ratio of liquid to solid constituents of the composition will vary from about 2 to 1 to 0.2 to 1. The bodies and the treating composition were fired at temperatures between 650 and 800° C., specifically about 725° C., for about 15 minutes.

The joining procedure of this invention was found to be particularly suited to making electrical connections to positive temperature coefficient of electrical resistance ceramics of the nature described in the copending application, Serial No. 850,226—Ingold et al., filed November 2, 1959, now U.S. Patent 3,037,942, and assigned to the same assignee as the present invention. These ceramics contain from 5 to 16 weight percent nickelous oxide, 2 to 20 titanium dioxide, remainder substantially all zinc oxide. Bodies within these composition ranges were joined to copper electrical contacts through use of the basic composition and the silver soldering paint previously referred to.

The $NH_4OH$ caused partial dissolution of the metal oxide surface at room temperature, thereby assisting formation of a strong bond. Then the 15 minutes' firing fused the silica gel inorganic binder and sintered the powdered iron to the oxide. The bonding procedure in this instance comprised coating the oxide with the basic composition, firing at about 725° C., coating the fired article with silver paint, refiring at about 700° C. and then soldering copper lead wires to the oxide. Additional joints were made by coating the oxide with the basic composition, painting the basic composition coating with silver paint and then performing a single firing at about 750° C. prior to the soldering operation. The latter procedure is advantageous since it eliminates a firing step.

The next step was the application of a silver-containing paint to the surfaces of the fired bodies together with a rosin-base electrical solder. The metal bodies were then assembled adjacent the ceramic bodies and the soldering operation completed. The joints were both strong and had extremely low electrical resistance so that maximum benefit was obtained from the unique properties exhibited by the ceramic metal oxide bodies.

Electrical measurements were made on all of the joints made to determine how good a bond had been obtained between the individual bodies. The first measurements were taken with a press contact between unbonded bodies and measurements were subsequently taken following the bonding operation. In the first instance, that is, with mechanical contact only, the resistance was on the order of $10^4$ ohms when a current of 100 milliamperes at 110 volts was passed through the joint. Resistance measurements made following the bonding operation were unable to detect any resistance caused by the joint. Thus, the resistance was essentially zero and represents a decrease of $10^4$ ohms on the samples tested.

It is thus apparent that the composition and process of this invention provides an economical, strong joint of low electrical resistance and further provides a process which can be readily carried out without special equipment or the use of highly skilled technicians.

What I claim as new and desire to secure by Letters Patent of the United States is:

A composition for treating the surfaces of metal oxide bodies to obtain strong joints of low electrical resistance between said metal oxide bodies and separate metal bodies, consisting essentially of finely-divided iron particles of not more than about 100 mesh particle size, a glass binder consisting essentially of glass particles of smaller size than said iron particles, said glass particles being fusible at a temperature of from about 650 to 800° C. to protect said iron particles from contamination by atmospheric oxygen, and ammonium hydroxide in amounts of from about 8 to 12 volume parts for each volume part of glass binder to dissolve a portion of the metal oxide surface, said ammonium hydroxide and said glass binder being present in combined amounts of from about 0.5 to 1.5 volume proportion of said iron particles.

References Cited in the file of this patent

UNITED STATES PATENTS

| | | |
|---|---|---|
| 2,103,598 | Smith | Dec. 28, 1937 |
| 2,245,541 | Goodwin | June 10, 1941 |
| 2,381,735 | Gantz | Aug. 7, 1945 |
| 2,510,000 | Vander Willigen et al. | May 30, 1950 |
| 2,534,392 | Walsh | Dec. 19, 1950 |
| 2,564,738 | Tank | Aug. 21, 1951 |
| 2,771,969 | Brownlow | Nov. 27, 1956 |
| 2,803,566 | Smith-Johannsen | Aug. 20, 1957 |
| 2,857,664 | Luks et al. | Oct. 28, 1958 |
| 2,902,756 | Cavanaugh | Sept. 8, 1959 |
| 2,934,443 | Shell et al. | Apr. 26, 1960 |